United States Patent [19]
Kamimura

[11] 3,937,182
[45] Feb. 10, 1976

[54] PET TOILET
[76] Inventor: Minako Kamimura, 8-19-5 Minami-Koiwa, Edogawa, Tokyo, Japan
[22] Filed: Apr. 5, 1974
[21] Appl. No.: 458,174

[52] U.S. Cl. ................................................ 119/1
[51] Int. Cl.² ........................................ A01K 29/00
[58] Field of Search ........................... 119/1, 19, 22

[56] References Cited
UNITED STATES PATENTS
3,791,348   2/1974   Marnett ............................... 119/19
3,793,988   2/1974   Traeger ............................... 119/1

Primary Examiner—Hugh R. Chamblee
Attorney, Agent, or Firm—Spensley, Horn and Lubitz

[57] ABSTRACT

This invention is designed to greatly improve the existing pet toilets by arranging a filter in such a manner that a filter belt is mounted for relative movement, and the solid waste on the filter drops into a small receptacle at one side of the box, while the liquid flows down into another small receptacle, whereby both liquid and solid wastes are very easily and sanitarily removed.

3 Claims, 4 Drawing Figures

PET TOILET

BACKGROUND OF THE INVENTION

1. Field of the Invention

This invention relates to a pet toilet, more particularly a toilet box for cats or other pets.

2. Prior Art

Boxes containing a liquid absorbent such as sand or any other litter therein have most commonly been used by cats (or other indoor pets) when performing their natural functions. Using these boxes, the liquid is absorbed into the litter and cats instinctively cover their solid waste with the litter. The litter must be changed periodically for cleanliness and to prevent unpleasant odors. The primary shortcomings of such boxes are: (a) the animals may often scatter the litter (sand) out of the box, and long-haired animals may even shake themselves, strewing the soiled litter outside of the box; and (b) unpleasant odors may emanate therefrom, even though the liquid and solid wastes are mixed with the litter.

The prior art discloses a number of compositions to solve the above general problems of sanitation caused by pets in a house or apartment. One such prior art teaches a box which is provided with shields around the box to prevent the litter from being scattered. This simple approach cannot give the pet owner a completely satisfactory result in solving the scattering problem. As to odors, it has become known that a specially prepared deodorizing material may be mixed with the litter to solve that problem. However, even with deodorized litter, it is almost impossible to eliminate the unpleasant odor completely. Consequently, despite his conscientious care the pet owner must tolerate a degree of unsanitary conditions and unpleasant odor in the vicinity of the box.

Another prior art device discloses a complicated structure which comprises switching solenoids, plumbing means and a connection to a main water supply. However, its complexity and expense are obviously disadvantageous, and the pet must be so taught or otherwise attracted to use this toilet. Still another prior art teaches a box having upper and lower compartments, separated by a perforated partition, the upper compartment containing the litter and the lower compartment containing a deodorizing substance such as lime or naphthalene. This device imposes upon the pet owner the expense of adding fresh lime or additional naphthalene to the lower compartment.

In the absence of an effective yet simple device, owners of indoor pets are thus obliged to compromise with inadequate toilet facilities.

This invention is a simple and compact toilet box which enables the cat owner to be free of nuisances caused by litter scattering and unpleasant odors.

BRIEF SUMMARY OF THE INVENTION

This invention provides quite a different type of pet toilet from any prior art devices. The invention comprises a belt-like member including a filter portion, a tray to collect the liquid waste, and two smaller receptacles contained within the parent box — one for liquid and the other for solid waste. The filter, provided with a support, slides like a conveyor belt around two rollers which are located at opposite sides of the box. When the animal (e.g., cat) eliminates, the liquid waste flows down through the filter onto a sloping tray below and through a hole pours into the liquid receptacle. By moving a grip attached to the filter belt from one end to the other, the solid waste deposited on the filter falls into the other receptacle, positioned against one wall of the parent box. Therefore, both the liquid and solid wastes are very easily collected into their respective receptacles which are then pulled out of the side of the parent box for removal.

Thus, it is a principal object of this invention to provide a simple pet toilet which is free of the litter scattering and odor problems.

Another object of this invention is to provide a sanitary pet toilet in which liquid and solid wastes are collected in separate receptacles.

Still another object of this invention is to provide a compact pet toilet, the construction of which is relatively simple, requiring easy handling in the cleaning process.

Still further object of this invention is to provide a pet toilet which does not require the use of litter.

The novel features which are believed to be characteristic of this invention, together with further objects and advantages thereof, will be better understood from the following description considered in connection with the accompanying drawings in which presently preferred embodiments of this invention are illustrated by way of example. It should be noted, however, that the drawings are for the purpose of illustration and description only and are not intended as a definition of the limits of this invention.

DETAILED DESCRIPTION OF THE PREFERRED EMBODIMENTS

Figure 1:
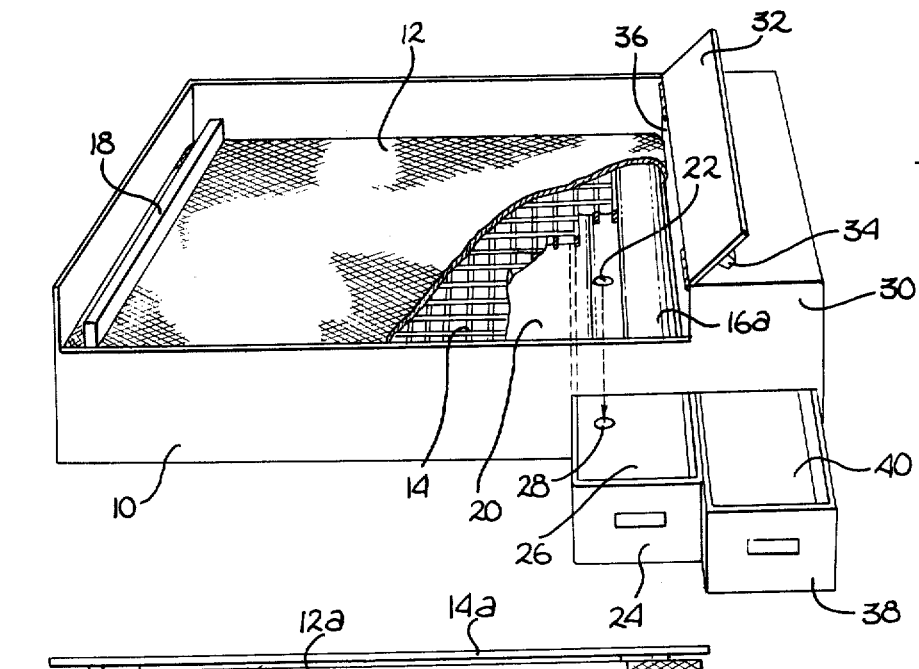
FIG. 1 shows a partially sectional front perspective view of an embodiment of this invention.

An understanding of the cat toilet of the present invention can be best gained by reference to FIG. 1 which illustrates a preferred embodiment of this invention. Cat toilet box 10 has a filter 12 at the upper face on which a cat rides when performing its function. Below the filter 12 is mounted a liquid collecting tray 20 with a hole 22 from which the liquid flows down to a receptacle 24 through an opening 28 arranged in a lid 26 of the receptacle 24. Another receptacle 38 is positioned at one side of the box 10 so that it receives the solid waste which falls from the filter 12 through an opening 36 between the filter 12 and a top lid 30 of the box 10 by sliding the filter 12. A movable lid 32 with a grip 34 shuts out the odor from escaping from inside 40 of the receptacle 38.

Figure 2:
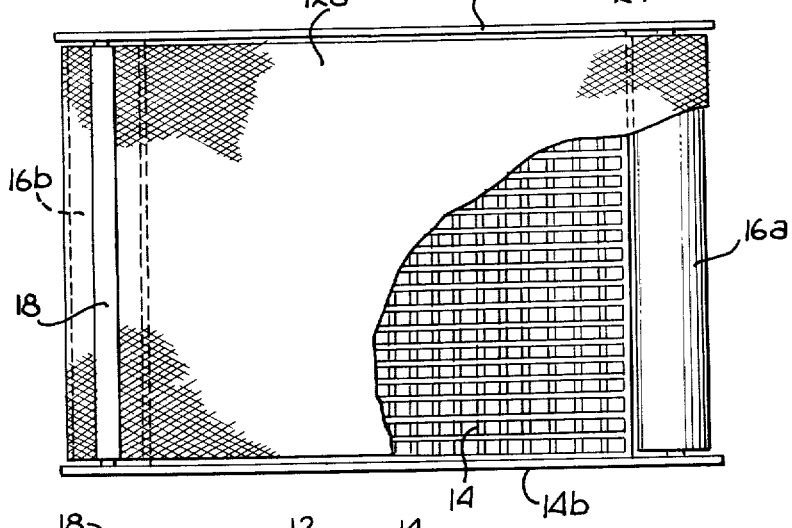
FIG. 2 shows a plane view of the filter of the embodiment shown in FIG. 1.
Figure 3:
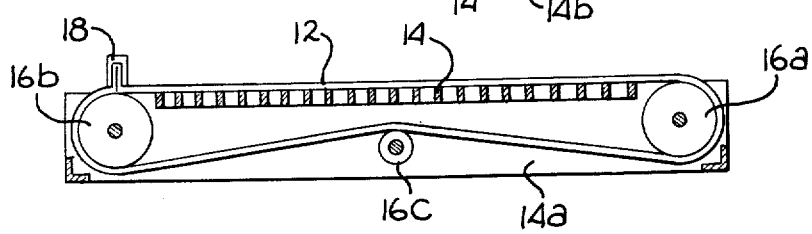
FIG. 3 shows a sectional side view of the filter shown in FIG. 2.

FIGS. 2 and 3 illustrate the form in which the filter 12 is constructed. The filter 12 shown in FIG. 2 consists substantially of a mesh filter belt 12a which slides around two rollers 16a and 16b, a grip 18 for manual movement of said belt 12a, a support 14 with its frame 14a mounted below said mesh filter belt 12a. An auxiliary roller 16c may be used to give the belt 12a proper tension. Material for the belt may be selected from metals, natural fibers and plastics. The structure and material of the support 14 should be strong enough to support the weight of the cat. In this respect, a lattice structure is one of the preferred embodiments, and the size of the lattice openings may preferably be large enough to support the cat.

Figure 4:
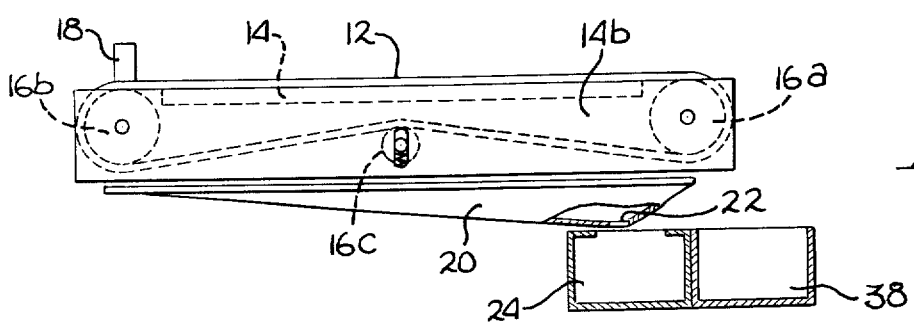
FIG. 4 shows a partial diagrammatic view of the embodiment shown in FIG. 1.

An understanding of the operation of the toilet can be gained by reference to FIG. 4. When the cat eliminates, the liquid flows down through the filter 12 into the tray 20 which is so sloped as to guide the liquid toward the hole 22. The liquid then pours into the receptacle 24 via hole 22 and opening 28.

By manually moving the grip 18, thus sliding the mesh belt 12a with it, from one end to the other, the solid waste deposited on the filter 12 drops through an opening 36 into another receptacle 38 below and positioned at one end of the box 10.

For practical purposes, one or more additional receptacles may be placed in the vacant space of the parent box 10, and the height of the peripheral walls of the box 10 may be adjusted in accord with the size of the animal so that it is likely to perform within the defined area. The entire system can be easily cleaned with water. The filter may be replaced at certain intervals for sanitary purposes. In order to be completely odor-free, any deodorizing substance may be used in both receptacles 24 and 38.

Accordingly, this invention overcomes both the scattering and odor problems with a simple and easy-handling structure. In addition, it requires no litter, nor replacement of litter, hence less expense to the cat owner and an inducement for more people to keep cats in the house. Some fastidious owners may wish to use litter or a deodorizer in the receptacles; however, even in such cases the cost of maintaining a pet will be much lower as compared with any of the prior art devices.

As many apparently widely different embodiments of this invention may be made without departing from the spirit and scope thereof, it is to be understood that this invention is not limited to the specific embodiments thereof except as defined in the appended claims.

I claim:

1. An indoor pet toilet for liquid and solid waste comprising:
    a belt-like member including a filter belt portion which is mounted for relative movement, said filter belt having a grip to manually move said belt;
    a tray which is positioned below said filter belt and which is so sloped as to guide said liquid from said filter belt toward at least one hole therein;
    at least one removable receptacle for said liquid waste which is so arranged that said liquid from said tray pours into said receptacle;
    at least one removable receptacle for said solid waste which is positioned adjacent one wall of said toilet, said receptacle for said solid waste having an opening disposed thereabove so that said solid waste falls into the inside thereof by manually moving said belt-like member, said receptacle for said solid waste and said receptacle for said liquid waste disposed in said toilet such that said receptacles can be selectively removed and replaced; and
    a lid member arranged and configured on said toilet adjacent said opening above said receptacle for said solid waste whereby odors are retarded from escaping from said solid waste receptacle.

2. An indoor pet toilet according to claim 1, wherein the belt-like member is made of a mesh filter belt, is provided with a support, and is slidable around two rollers; and the liquid pours into the receptacle through the hole of the tray and an opening of said receptacle.

3. A cat toilet according to claim 1, wherein the filter is changeable.

* * * * *